United States Patent [19]

Kuppers et al.

[11] Patent Number: 4,955,014
[45] Date of Patent: Sep. 4, 1990

[54] BROADBAND OPTICAL COMMUNICATION SYSTEM, PARTICULARLY IN THE SUBSCRIBER AREA

[75] Inventors: Dieter Kuppers, Stuttgart; Klaus Herse, Weil der Stadt; Kate Hiepe-Wohlleben, Leonberg; Manfred Kaiser, Hemmingen; Friedemann Mohr, Renningen; Horst Ohnsorge, Freiberg/N., all of Fed. Rep. of Germany

[73] Assignee: Alcatel N. V., Amsterdam, Netherlands

[21] Appl. No.: 115,254

[22] Filed: Oct. 30, 1987

[30] Foreign Application Priority Data

Oct. 31, 1986 [DE] Fed. Rep. of Germany ....... 3637097
Mar. 24, 1987 [DE] Fed. Rep. of Germany ....... 3709678

[51] Int. Cl.$^5$ ........................ H04J 14/04; H04J 16/24
[52] U.S. Cl. ..................... 370/3; 350/96.15; 370/1; 455/600; 455/609; 455/611; 455/612
[58] Field of Search ............... 455/600, 606, 609, 610, 455/611, 612, 617, 613; 370/1, 3; 350/96.15, 96.16

[56] References Cited

U.S. PATENT DOCUMENTS

| | | | |
|---|---|---|---|
| 3,761,716 | 6/1973 | Kapron et al. | 250/199 |
| 3,777,149 | 9/1973 | Marcatili | 250/209 |
| 4,366,565 | 5/1982 | Herskowitz | 370/1 |
| 4,601,535 | 5/1986 | Tanaka et al. | 350/96.20 |
| 4,768,851 | 9/1988 | Shaw et al. | 350/96.15 |

FOREIGN PATENT DOCUMENTS 0143739  6/1985  European Pat. Off. ............ 455/610

OTHER PUBLICATIONS

"Fiber-Optic Modal Coupler Using Periodic Microbending", Optics Letters, Mar. 1986, vol. 11, No. 3, J. N. Blake et al.
Wolf; Handbook of Fiber Optics: Theory and Applications; Garland Publishing; New York; 1979; pp. 72-74.
Helmut Haag et al., "Lichtwellenleiter und Lichwellenleiterkabel"; Optische Nachrichtentechnik; ntz Bd. 39, (1986), Heft 7; pp. 454-459.
H. Bauch et al., "Optischer Teilnehmersanschluss fur Offentliche Kommunikationsnetze", Optische Nachrich.; ntz Bd. 39, (1986), Heft 7; pp. 502-508.
Clemens Baack; "Breitbandtechniken fur das Zukunftige Integrierte Breitbandfernmeldenetz"; Optische Nachrich.; ntz Bd. 39, (1986), Heft 7; pp. 484-489.

Primary Examiner—Joseph A. Orsino
Assistant Examiner—L. Van Beek
Attorney, Agent, or Firm—Christie, Parker & Hale

[57] ABSTRACT

For short-distance communication systems, particularly for optical-waveguide links in the subscriber area, it is proposed to operate the standard single-mode optical waveguide for long-distance applications, which is optimized for the wavelength range from 1300 nm to 1600 nm, with optical transmitters and optical receivers whose operating wavelengths lie clearly below the cutoff wavelength of the optical waveguide. By means of a suitable stable laser-waveguide coupling, it is ensured that single-mode operation is achieved, which is necessary to transmit digital signals at high bit rates. The increased loss of the optical waveguide at 800 nm can be accepted because of the relatively short length of subscriber lines. Both unidirectional and bidirectional transmission over a single optical waveguide using wavelength-division or modal multiplexing is possible.

11 Claims, 2 Drawing Sheets

BROADBAND OPTICAL COMMUNICATION SYSTEM, PARTICULARLY IN THE SUBSCRIBER AREA

TECHNICAL FIELD

The present invention relates to a broadband optical communication system, and more particularly to short-distance communication systems for optical-waveguide links in the subscriber area.

BACKGROUND ART

A broadband optical communication system, particularly for the subscriber area, comprising at least one optical transmitter, at least one optical receiver, and an optical waveguide in which only the fundamental mode can propagate above a cutoff wavelength, e.g., 1,280 nm, is described in "ntz," Vol. 39 (1986), No. 7, pp. 484–489. In that prior art printed publication, it is taught that a single-mode optical waveguide which has the smallest loss and the largest bandwidth in the optical long-wave range from 1300 nm to 1600 nm is a suitable transmission medium which is suitable for all broadband optical communication systems, including the subscriber area where the subscribers are connected to the local exchange in a star network.

As is well known, such "single-mode" optical waveguides are in fact single-mode only for wavelengths above a certain cutoff wavelength (which depends on the core diameter and the refractive indices of the core and the cladding). Above such a cutoff wavelength, only the fundamental mode can propagate; at wavelengths below this cutoff wavelength, two or more modes can propagate (see "ntz," Vol. 39, [1986], pp. 454–459.)

In the first-mentioned publication, it is stated that the optical transmitters and receivers must be tuned to the long-wave optical range (1300 nm to 1600 nm), and that great efforts still need to be made to achieve low-cost manufacture. It is to be noted that no low-cost solution to the problem of transmitting optical signals over optical waveguides in the subscriber area is given in the cited printed publication.

"ntz," Vol. 39 (1986), No. 7, pp, 502–508, contains additional teachings to the effect that a single-mode optical waveguide is the type of optical-waveguide best suited for the optical subscriber line, but that the high costs of the necessary optical-to-electric transducers prevent an early introduction of broadband optical subscriber lines.

DISCLOSURE OF INVENTION

It is, therefore, the object of the present invention to remedy the above noted shortcomings in the prior art and provide a low-cost system solution which is particularly suitable for applications in the subscriber area.

This object is attained by means of a novel optical transmitter and optical receiver which respectively comprise a semiconductor laser and a semiconductor photodiode, whose respective operating wavelengths are clearly below the cutoff wavelength of the optical waveguide (e.g., in the 800-nm wavelength range), but with the laser being coupled to the optical waveguide in such a way that only a single mode can be excited in the waveguide.

Such a communication system has the following advantages:

Semiconductor components are used which are already now available at low cost. Thus, the biggest obstacle to the introduction of a low-cost optical subscriber line is removed.

The transmission medium used is a type of optical waveguide which has gained acceptance for long distance applications and which has the lowest loss and the lowest dispersion in the wavelength range from 1300 to 1600 nm, i.e., which is currently the optimum optical-waveguide type for long-distance applications and for such wavelengths. The use of this type saves the cost of developing an optical waveguide specifically designed for the subscriber area. Because of the large number of subscriber lines in the subscriber area, considerably greater quantities have to be produced than if the waveguide were used exclusively for long-distance applications, further facilitating the economic production of this type of optical waveguide.

The particular laser-waveguide coupling proposed herein is a very simple solution to the coupling problem described in the literature, "ntz," Vol. 39 (1986), No. 7, pp. 502–508; that problem is less severe for applications in the subscriber area than for long-distance applications but still is described as a hitherto unsolved problem.

By coupling the laser-waveguide by means of an adhesive applied to the coupling lens with which the laser light would otherwise exit into the air, the angle of emergence of the laser light from the laser is decreased, because the adhesive has a higher refractive index than air. Thus, the adhesive provides some focusing action. In addition, coupling by means of an adhesive has the advantage that light transmitted in the cladding either due to back-scattering or to reflections within the optical transmission path cannot reach the laser and deteriorate the properties of the latter, as would be the case if a lens were used to couple the laser light into the optical waveguide.

The invention is also applicable to a bidirectional communication system since the fused-fiber couplers commonly used to separate the two directions of transmission and the different wavelengths used in such a system do not impair the stability of the transmitted fundamental mode; on the contrary, it has been found that such fused-fiber couplers actually tend to suppress any higher-order modes that may arise anywhere on the transmission path.

It is also possible to transmit two optical signals of the same wavelength but with different modes over the optical waveguide. This represents a considerable cost savings compared to the use of different wavelengths.

BRIEF DESCRIPTION OF DRAWINGS

Embodiments of the invention will now be explained with reference to the accompanying drawings, in which.

BEST MODE FOR CARRYING OUT THE INVENTION

Figure 1:
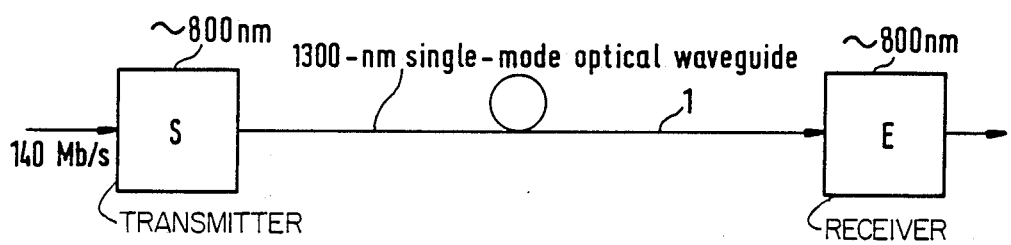
FIG. 1 shows the basic principle of the combination of an electric-to-optical transducer, an optical-to-electric transducer, and a single-mode optical waveguide in accordance with the invention.

In the optical communication system of FIG. 1, like in all optical communication systems, an optical transmitter S, which may consist of a so-called "electric-to-optical transducer," is connected via an optical waveguide 1, used as the transmission medium, to an optical receiver E, which may consist of a so-called "optical-to-electric transducer." The novel feature of the particular system shown in the Figure is that a 1300-nm single-mode optical waveguide is combined with an optical transmitter and an optical receiver whose operating wavelengths lie in the range of 800 nm and, thus, clearly below the cutoff wavelength of the single-mode optical waveguide, which is suitable for transmission in the range of 1300 nm to 1600 nm. Single-mode operation is necessary in order to be able to transmit digital signals at high bit rates, e.g., 140 Mb/s, error-free. If the light propagated in the optical waveguide in two or more modes, such a high bit rate would be impossible because of the known effect of modal dispersion.

According to the invention, the necessary single mode operation is achieved by coupling the light to the optical waveguide in such a way that only a single mode will be excited, and the higher-order modes which could also propagate in the waveguide will not form at all, even though the laser's operating wavelength lies below the cutoff wavelength of the optical waveguide. The optical transmitter S is a GaALAs laser operating at 800 nm, and the receivers E are silicon photodiodes, whose properties are precisely known and which are currently the least expensive transmitting and receiving devices obtainable—for example, millions of GaALAs lasers with a wavelength of 780 nm are used in CD players.

Since the single-mode waveguide 1 has an attenuation of about 2.5 dB/km at an operating wavelength of 780 nm, while the attenuations at 1300 nm and 1550 nm are 0.4 dB/km and 0.2 dB/km, respectively, the attenuation of the novel system of FIG. 1 is higher than that of the conventional type of system proposed in the literature, which operates at 1300 or 1500 nm. However, such an attenuation increase can be readily tolerated for applications at the subscriber level, where the length of the individual transmission paths from the local exchange to the subscriber does not exceed 12 km (95% are less than 6 km), since a sufficient reserve is available in view of the transmitter power and the receiver sensitivity. Accordingly, it should be noted that the present invention may find application to any application in which such an attenuation can be tolerated, and is not necessarily limited only to systems in the subscriber area.

If single-mode operation is to be achieved at a wavelength at which multimode operation would also be possible, the coupling of the laser to the optical waveguide is of primary importance, because, firstly, only one mode, preferably the fundamental mode $LP_{01}$, is to be excited as far as possible, and secondly, the coupling must be stable in time and insensitive to temperature variations. If the coupling shifts, the next higher-order mode $LP_{11}$ will be excited, so that the necessary single-mode operation will be adversely affected.

The coupling of a laser to a single-mode optical waveguide in accordance with the invention will now be explained with the aid of FIG. 2. A laser 2 with an active layer 3 is fastened to or otherwise formed on a supporting substrate 4. The single-mode optical waveguide 1, whose core is designated 5, is positioned relative to the laser 2 in such a way that its end face into which the laser light is to be coupled is as close as possible to the light-emitting surface of the laser 2. The optical waveguide is a so-called fiber pigtail and has a length of about 1n. The waveguide end facing the laser 2 is preferably adjusted so that the near field observable at the other end (of its length of 1n) shows an intensity distribution which is exactly equal to that of the fundamental model $LP_{01}$. For the adjustment, a conventional positioning table can be used with which the optical waveguide is shiftable in all three coordinate directions with high accuracy.

Prior to the adjustment, an adhesive 6 is applied to that surface of the laser 2 to which the optical waveguide is to be coupled, and after the adjustment, this adhesive is cured by irradiation with ultraviolet light. It must be ensured that the end face of the optical waveguide joined to the laser is separated from the laser by a short distance—preferably about 20 $\mu m$. A significantly shorter distance may result in the optical waveguide coming into contact with the light emitting surface of the laser and damaging this surface, and a significantly greater distance would degrade coupling efficiency. To stabilize the adhesive joint between the end face of the optical waveguide and the laser surface, the optical waveguide is cemented onto a support 7 at a short distance from the laser. Support 7 is integral with or otherwise rigidly attached to supporting substrate 4. The stability of the coupling is of fundamental importance to reliable single-mode operation. A slight change in the coupling in the form of a longitudinal displacement of the fiber by as little as 0.1 $\mu m$ would immediately result in the excitation of the unwanted next higher-order mode $LP_{11}$.

In tests, the coupling obtained by using an adhesive as described proved to be extremely rugged. It was stable to vibration and exhibited no variation with time. In view of the properties of the adhesive, no change in the coupling is to be expected even over periods of years. The adhesive used is a commercially available optical cement which, because of its good permanent properties, is recommended by the manufacturer for splicing optical waveguides. Favorable properties of this cement are, for example, its refractive index of 1.56 and its longterm temperature stability from $-80°$ C. to $+90°$ C.

After this description of the laser-waveguide coupling, the characteristics of the system of FIG. 1, which uses this coupling, will be dealt with. The CD laser HL 7801 of Hitachi, which has an operating wavelength of 780 nm, has the property of becoming multimode when driven with high-frequency signals. The modes formed are longitudinal modes which do not appreciably influence the form of the emergent light cone in which the fundamental mode is emitted. Thus, the excitation of the fundamental mode as the single mode remains independent of whether the laser is unmodulated or is modulated with a high-frequency signal. In any case, single-mode light propagation was observed in the optical waveguide. The higher-order modes which are present in the emitted laser light when the laser is modulated with a high-frequency signal result in an increase of the linewidth of the emitted light. Because of the material dispersion of the optical waveguide, the light pulses of the transmitted optical signal are thus subjected to increased delay distortion. This delay distortion, however, can be tolerated without a substantial deterioration of transmission quality if the length of the optical-waveguide link is only a few kilometers, as is the case with subscriber lines.

An experiment has shown that digital signals can be transmitted at a bit rate of 34 Mb/s and with sufficient quality over a 12-kilometer link of the kind described. Even after 12 km, no components of the higher-order mode $LP_{11}$ could be observed.

Prior to those experiments, there would have been considerable uncertainty as to whether the excited fundamental mode remains stable over such a fiber length and does not transform into higher-order modes. The known relevant literature does not set forth any equation for predicting the coupling length, i.e., the length after which the light energy coupled into the fiber in a single mode divides evenly between the modes which are possible in the optical waveguide, i.e., the modes $LP_{01}$ and $LP_{11}$. The stability of the fundamental mode in the single-mode optical waveguide is presumably connected with the fact that the fundamental mode $LP_{01}$ is greatly different from the next higher-order mode $LP_{11}$ in its spatial energy distribution.

In optical communication systems, connectors and splices are commonly used. For example, the fiber pigtail joined to the laser with an adhesive is connected with the waveguide by means of a connector, and a corresponding connection is made at the receiving end in the optical receiver E. To demonstrate the realizability of the system in accordance with the invention, it was important to show that neither at connectors nor at splices, does the excited fundamental mode change into one or more higher-order modes. Surprisingly, the fundamental mode turned out to be extremely stable in this respect, too, and no degradation of transmission performance due to the insertion of connectors or splices into the link was noticed, provided connectors with losses lower than 1 dB were used and the splices were made expertly.

In connection with the above-mentioned adhesive 6 for obtaining a stable laser-waveguide coupling, two advantageous properties should be mentioned:
For matching the refractive index of the active layer 3 of the laser 2, which lies in the range from 3 to 5, to the refractive index of the core 5 of the optical waveguide 1, which is 1.45, the adhesive refractive index of 1.56 is better suited than the refractive index of air, which is 1. The refractive index of the adhesive, which is higher than that of air, ensures that the laser light emerges from the laser, and is launched into the core of the optical waveguide, at a smaller angle than would be the case if the space between the laser and the optical waveguide were an air gap. The adhesive thus provides some focusing action and, consequently, increases the coupling efficiency.

Figure 2:
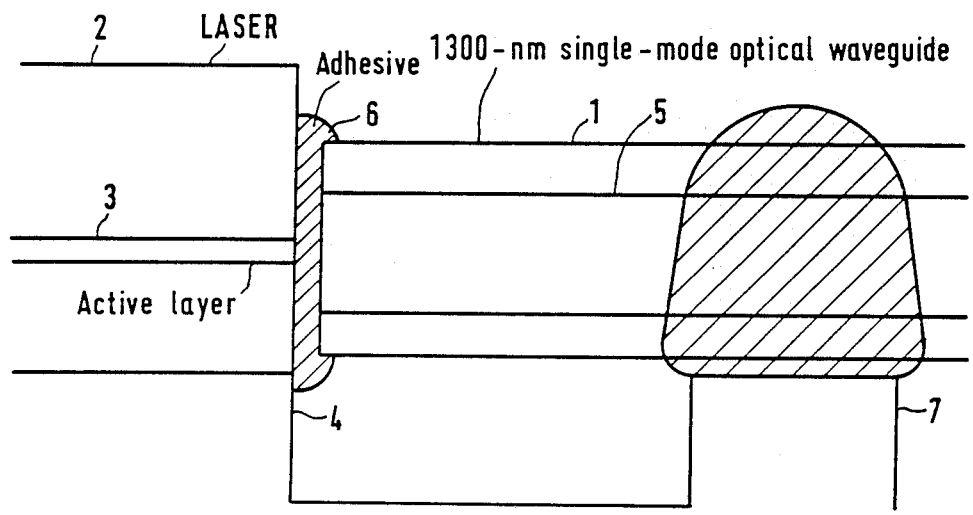
FIG. 2 shows an embodiment of the laser-waveguide coupling suitable for use in the system of FIG. 1.

The laser-waveguide coupling of FIG. 2 has a coupling loss of 6 dB, whereas a lens coupling would have a loss of only 3 dB, but such an increased loss of the coupling in accordance with the invention has the advantage that light transmitted in the cladding back to the laser due to reflections at connectors or due to Rayleigh scattering does not adversely affect the laser. At a wavelength of 800 nm, light scattering is much more intensive than at 1300 nm and 1500 nm. If a lens were used to accomplish the laser-waveguide coupling, the cladding light scattered from the optical waveguide back to the laser would be focused on the laser, too, and would degrade the laser performance by causing line narrowing as well as abrupt changes in frequency and intensity. By contrast, the adhesive joint of FIG. 2 has the advantageous effect that much less light is reflected into the laser than if a lens were present.

If the system according to the invention is used in the subscriber area, it is desirable for the transmission to take place in both directions over a single optical waveguide. It has been experimentally verified that even bidirectional operation over a fiber-optic link containing conventional fused-fiber directional couplers for wavelength-selective direction separation is possible using the principles underlying the present invention.

Figure 3:
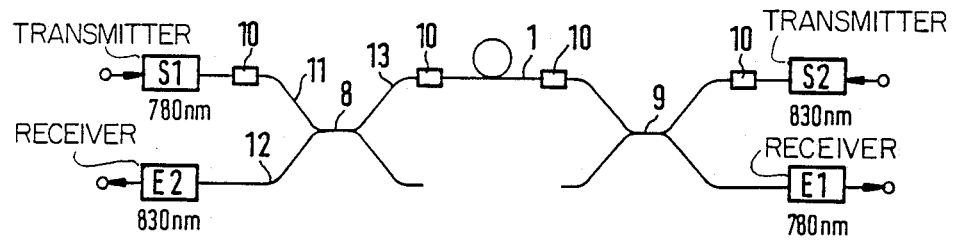
FIG. 3 shows an application of the invention to a bidirectional optical communication system using different wavelengths.

FIG. 3 shows a system for bidirectional optical transmission using different wavelengths. A wavelength of 780 nm is used for one direction of transmission from a transmitter S1 to an optical receiver E1, and a wavelength of 830 nm for the opposite direction from a transmitter S2 to a receiver E2.

To separate the two directions of transmission, wavelength-selective directional couplers 8 and 9 in the form of conventional fused-fiber couplers are present at both ends of the transmission path. Like in FIG. 1, the transmission medium is a single-mode optical waveguide 1 whose cutoff wavelength is just under 1300 nm and which, like the optical waveguide in the system of FIG. 1, is operated clearly below this cutoff wavelength.

The reference numerals 10 denote fiber-optic connectors which connect the ends of the fused-fiber directional couplers to laser pigtails or to the optical waveguide 1.

Surprisingly, it turned out that light with a wavelength of 780 nm which is coupled into the port 11 of the coupler 8 in the fundamental mode emerges from the port 13 of the coupler in pure form in the same mode, and that light with a wavelength of 830 nm coupled into the port 13 of the coupler 8 in the fundamental mode appears at the port 12 in pure form in the same mode; the same applies analogously to the coupler 9. In other words, single-mode operation in the multimode region of a single-mode optical waveguide is possible even with conventional couplers even in bidirectional wavelength-division multiplex. It was even found that the fused-fiber directional couplers suppress higher-order modes if such modes should form anywhere on the transmission path or be excited by imperfect coupling.

In a system as shown in FIG. 3, a low-cost bidirectional broadband optical subscriber line can thus be implemented with a single optical waveguide. A link as shown in FIG. 3 with a length of 5.5 km was tested at a bit rate of 140 Mb/s in the bidirectional mode using the two wavelengths specified above, and a stable bit-error rate of $10^{-9}$ was achieved.

The principles underlying the invention are also applicable to systems in which, in addition to the fundamental mode, higher-order modes are excited and transmitted in a greatly reduced but still observable rate, and in which these higher-order modes are suppressed by suitable mode filters, such as the above-mentioned fused-fiber directional couplers, at the end of the transmission path before the light enters the optical-to-electric transducer, because such systems, too, make use of the principle of the invention to use a single-mode optical waveguide not in its single-mode wavelength range as in its typical application, but in its multimode wavelength region, and nevertheless achieve single-mode operation.

A coupling corresponding to FIG. 2 is also possible between the optical waveguide and the photodiode at the receiving end, both in systems according to the present invention and in any other system.

In the following, an advantageous aspect of the invention will be described with the aid of FIGS. 4 and 5 which permits each of two optical signals to be transmitted over the optical waveguide in a single mode using only a single wavelength which, in accordance with the principle of the invention explained above, lies below the cutoff wavelength of the optical waveguide.

Figure 4:
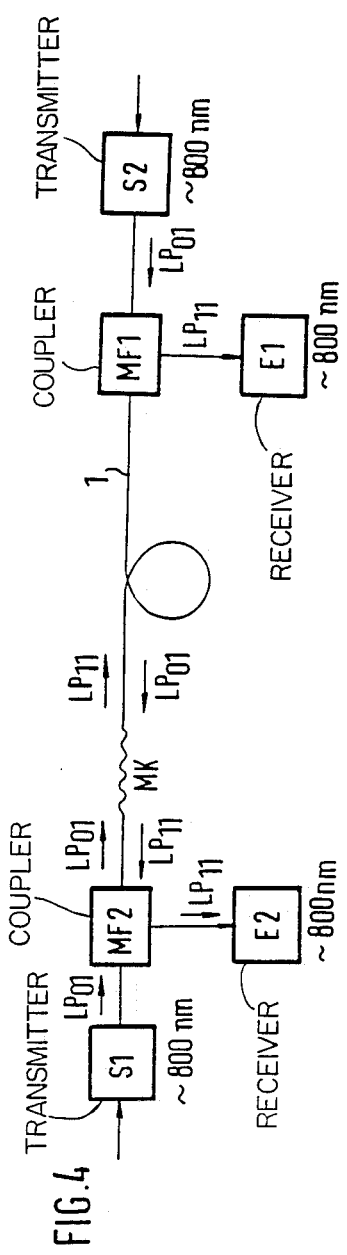
FIG. 4 shows a bidirectional communication system in accordance with the invention using different modes.

FIG. 4 shows a bidirectional optical communication system with a single optical waveguide 1 as the transmission medium. Unlike in the system of FIG. 3, the optical signals to be transmitted in the two directions have the same wavelength. Coupled to each end of the optical waveguide 1 is a semiconductor laser S1, S2. These two optical transmitters operate at the same wavelength, which is so chosen with regard to the optical waveguide 1 that only the fundamental mode $LP_{01}$ and the next higher-order mode $LP_{11}$ can propagate in the optical waveguide 1. With respect to the coupling of the two optical transmitters to the optical waveguide 1, the statements made above in connection with FIG. 1 apply, namely that the coupling is so constituted that the output of the optical transmitter is coupled into optical waveguide 1 only in the fundamental mode $LP_{01}$.

At the two terminals, modal filters MF1 and MF2 are inserted in the optical waveguide 1 near the transmitters. These modal filters do not influence an optical signal which is guided in the fundamental mode. Anywhere on the transmission path between the two modal filters, preferably in the area of a terminal (in the embodiment of FIG. 4 near the transmitter S1), the optical waveguide contains a modal coupler MK which has the property of converting an optical signal arriving in the fundamental mode LP01 to the next higher-order mode $LP_{11}$, and this in each of the two directions of transmission. A modal coupler suitable for this purpose is described in "Optics Letters," Mar. 1986, Vol. 11, No. 3, pp. 177–179.

The optical signal coupled into the optical waveguide by the transmitter S1 is thus transmitted to the modal coupler MK in the fundamental mode $LP_{01}$, and from there to the distant terminal in the next higher-order mode $LP_{11}$. In the opposite direction, the optical signal coupled into the optical waveguide by the transmitter S2 is transmitted to the modal coupler MK in the fundamental mode $LP_{01}$, and from there to the modal filter MF2 in the next higher-order mode $LP_{11}$. Each of the two modal filters MF1 and MF2 couples the optical signal transmitted in the higher-order mode $LP_{11}$ out of the optical waveguide and passes it to the associated optical receiver E1, E2. The receiver E1 thus receives the optical signal from the transmitter S1, and at any point of the transmission path it is ensured that the two existing optical signals have different modes.

There is no coupling of components of one signal to the other signal since, as mentioned above, the two modes $LP_{01}$ and $LP_{11}$ are greatly different with respect to their spatial energy distribution over the cross section of the optical waveguide 1. Each of the two modes thus has a high stability. Moreover, even if a small portion of a transmitted signal converted to the other mode, this would only result in a corresponding loss of power. The converted portion would not strike a receiver anywhere, and would thus in no way interfere with a signal transmission.

The system of FIG. 4 may be called a "bidirectional modal multiplex system," which, because it uses only one type of transmitter and one type of receiver, is clearly superior to a bidirectional wavelength-division multiplex system in terms of cost and also offers all the other advantages of the present invention mentioned in connection with the system of FIG. 1.

Figure 6:
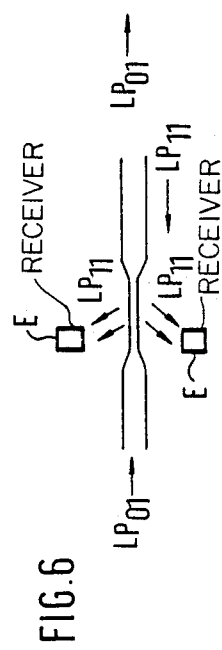
FIG. 6 shows an embodiment of a modal filter.

In the simplest case, the modal filters MF1 and MF2 for coupling out the optical signal transmitted in the higher-order mode $LP_{11}$ and passing it to the receiver will be an optical-waveguide section as shown in FIG. 6, which is reduced in diameter and from which the plastic coating was removed ("taper"). In the region of the reduced cross section, only the fundamental mode $LP_{01}$ can propagate, so that the other optical signal, which is present in the higher-order mode $LP_{11}$, is radiated from this section into the environment and reaches an optical receiver E located in the environment. The region of the optical-waveguide section of reduced cross section is preferably embedded in a medium which protects the surface of the optical-waveguide section and focuses the radiation emerging from that region on the optical receiver E.

Another type of modal filter which contains a coupler is described in "Optics Letters," Vol. 11, No. 9, Sept. 1986, pp. 581–583.

Figure 5:
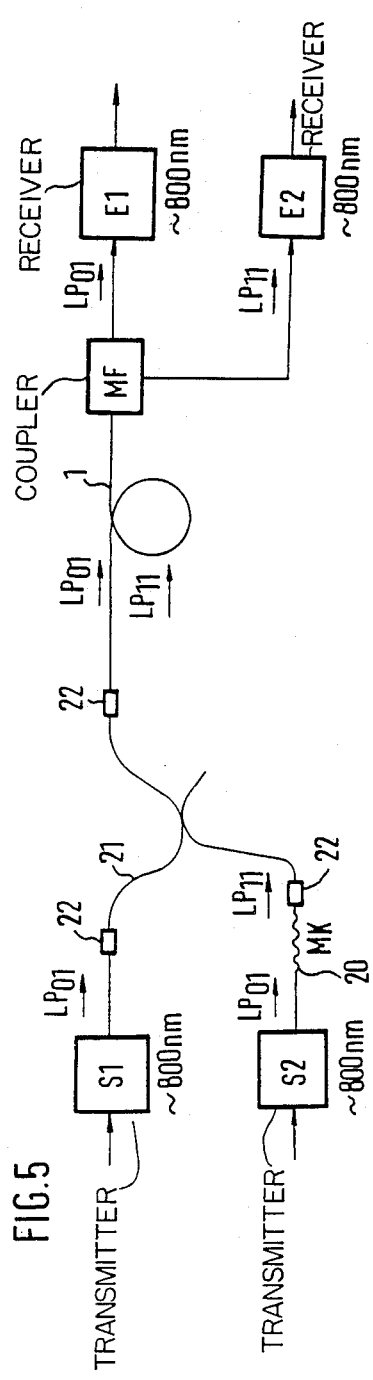
FIG. 5 shows a unidirectional communication system in accordance with the invention having more than one subscriber at each terminus.

FIG. 5 shows an optical communication system for transmitting two optical signals at a single operating wavelength in a unidirectional mode.

In this case, the two semiconductor lasers used as the optical transmitters S1 and S2 are coupled to one end of the optical waveguide 1, and the associated optical receivers E1 and E2 to the other end. For the operating wavelengths of the transmitters and receivers in relation to the transmission characteristics of the optical waveguide 1, the same assumptions are made as in the bidirectional system of FIG. 4.

The optical transmitter S1 couples its output through a fused-fiber coupler 21 into the optical waveguide 1 in the fundamental mode $LP_{01}$. In this fundamental mode, the signal passes through the optical waveguide, including a modal filter MF inserted therein, and reaches an optical receiver E1. The second optical transmitter S2 couples its output in the fundamental mode $LP_{01}$ into a fiber pigtail 20 coupled to the optical waveguide 1 via the coupler 21. This fiber pigtail 20 contains a modal coupler MK which converts the fundamental mode $LP_{01}$ to the next higher-order mode $LP_{11}$, so that this optical signal propagates down the optical waveguide 1 in the higher-order mode until it is coupled out of the optical waveguide 1 in the modal filter MF and reaches the optical receiver E2. The reference numerals 22 denote fiber-optic connectors which connect the ends of the fused-fiber coupler 21 to fiber pigtails or to the optical waveguide 1. The modal coupler MK can be inserted into the optical waveguide by using either conventional connectors or splices.

In the system of FIG. 5, care must be taken to ensure that no unwanted mode conversion takes place, because otherwise one of the receivers might receive an optical signal not destined for it.

Both the system of FIG. 4 and that of FIG. 5 work on the fundamental principle of the invention that for each of the optical signals to be transmitted, transmission takes place in a single mode although at the operating wavelength chosen, a second mode could propagate as well.

The present invention has been described above with regard to the certain presently contemplated specific embodiments of the invention. It will be appreciated to those skilled in the art that modifications and variations thereof are possible within the spirit and scope of the appended claims.

What is claimed is:

1. A broadband optical communication system comprising
    an optical waveguide having an associated cutoff wavelength below which a fundamental mode and at least one higher order mode can propagate throughout the waveguide,
    a first semiconductor laser having a light emitting surface at a first end of said waveguide for transmitting a first optical signal in a fundamental mode at a first operating wavelength which is clearly below said predetermined cutoff wavelength,
    a first semiconductor photodiode at a second end of said waveguide for receiving said fundamental mode of said first optical signal at said first operating wavelength, and
    means for positioning said first semiconductor laser relative to said first end of the optical waveguide such that only said fundamental mode is excited in any portion of the waveguide in response to said first semiconductor laser transmitting said first optical signal.

2. A system as claimed in claim 1 which is particularly adapted for application in the subscriber area, wherein
    the length of said waveguide is less than 12 km, said waveguide is of a type having low loss and high bandwidth in the optical long-wave (1300 nm to 1600 nm) range and is also suitable for other broadband optical applications,
    said cutoff frequency is below 1300 nm and well above 800 nm, and
    said operating wavelength is about 800 nm.

3. A system as claimed in claim 1 wherein said cutoff frequency is about 1280 nm.

4. A system as claimed in claim 1, wherein said positioning means comprises an optical cement coupling said first end of the optical waveguide to the light-emitting surface of the laser.

5. A broadband optical communication system comprising
    an optical waveguide having an associated cutoff wavelength below which it is possible for a plurality of modes to propagate and above which only a fundamental mode can propagate,
    a first semiconductor laser at a first end of said waveguide for transmitting a first optical signal at a first operating wavelength which is clearly below said predetermined cutoff wavelength,
    a first semiconductor photodiode at a second end of said waveguide for receiving said first optical signal at said first operating wavelength, and
    means for coupling said first semiconductor laser to said optical waveguide in such a way that only a single mode is excited in any particular portion of the waveguide in response to said first semiconductor laser transmitting said first optical signal,
    a second semiconductor laser at said second end of said waveguide for transmitting a second optical signal having a wavelength different from that of said first optical signal,
    a second semiconductor photodiode at said first end of said waveguide for receiving said second optical signal, and
    a plurality of fused-fiber directional couplers,
wherein
    both said first and second optical signals are propagated through said optical waveguide in opposing directions using wavelength-division multiplexing, and
    said couplers act as directional wavelength-separating/wave length-combining devices,
whereby said first and second optical signals may be propagated through said optical waveguide at a high bit rate from said first end to said second end and from said second end to said first end respectively.

6. A system as claimed in claim 5, wherein the two wavelengths for the two directions of transmission are 780 nm and 830 nm.

7. A broadband optical communication system comprising
    an optical waveguide having an associated cutoff wavelength below which it is possible for a plurality of modes to propagate and above which only a fundamental mode can propagate, said optical waveguide including at least a first common portion through which only the fundamental mode $LP_{01}$ and the next higher-order mode $LP_{11}$ can propagate at said first operating wavelength,
    a first semiconductor laser at a first end of said waveguide for transmitting a first optical signal at a first operating wavelength which is clearly below said predetermined cutoff wavelength, said first optical signal propagating through said first common portion in said fundamental mode $LP_0$,
    a first semiconductor photodiode at a second end of said waveguide for receiving said first optical signal at said first operating wavelength, and
    means for coupling said first semiconductor laser to said optical waveguide in such a way that only a single mode is excited in any particular portion of the waveguide in response to said first semiconductor laser transmitting said first optical signal,
    a second semiconductor laser whose operating wavelength is equal to said first operating wavelength for transmitting a second optical signal,
    a second semiconductor photodiode for receiving said second optical signal, and
    second coupling means for coupling said second semiconductor laser to said first common portion of the optical waveguide in such a way that said second optical signal is transmitted through said first common portion in said next higher-order mode $LP_{11}$ before being received by said second semiconductor photodiode,
whereby said first and second optical signals may be propagated through said optical waveguide at a high bit rate from said first end to said second end and from said second end to said first end respectively.

8. A system as claimed in claim 7, wherein
    said second optical signal is transmitted in a second direction from the vicinity of said second end to the vicinity of said first end, said first coupling means comprises
a first modal filter between said first semiconductor laser and said first common portion for coupling any higher-order mode $LP_{11}$ optical signal from said first common portion to said second semiconductor photodiode, and said second coupling means comprises
a second common portion of said waveguide between said first common portion and said second end also through which only the fundamental mode $LP_{01}$ and the next higher-order mode $LP_{11}$ can propagate at said first operating wavelength,
a modal coupler between said first common portion and said second common portion for converting an optical signal transmitted therethrough from the fundamental mode $LP_{01}$ to the next higher-order mode $LP_{11}$ in each of the two directions of transmission, and
a second modal filter between said second semiconductor laser and said second common portion for coupling any higher-order mode $LP_{11}$ optical signal from said second common portion to said first semiconductor photodiode, and said second optical signal propagates through said second common portion in said fundamental mode $LP_{01}$.

9. A system as claimed in claim 8 wherein said first and second modal filter are each an uncladded section of optical waveguide whose diameter is sufficiently small that propagation therethrough in said higher-order mode $LP_{11}$ is essentially blocked and that essentially all the received optical signal being propagated in said higher-order mode is radiated into the exterior environment of the optical-waveguide section where it may be received by the first or second semiconductor photodiode associated therewith.

10. A system as claimed in claim 7, wherein
said second semiconductor laser is in the vicinity of said first end,
said second semiconductor photodiode is in the vicinity of said second end,
both said first and second signals are transmitted in said first direction,
said first coupling means couples said first optical signal to said first common portion in the fundamental mode $LP_{01}$,
said second coupling means comprises
an optical-waveguide pigtail into which is coupled said second optical signal in the fundamental mode $LP_{01}$ and
a modal coupler which converts said fundamental mode $LP_{01}$ into the next higher-order mode $LP_{11}$, and
said second coupling means couples said second optical signal to said common portion in the next higher-order mode $LP_{11}$, and
the optical waveguide comprises a modal filter in the vicinity of said second end between said common portion and said first and second semiconductor photodiodes for
propagating the first optical signal transmitted in the fundamental mode $LP_{01}$ directly to said first semiconductor photodiode and
coupling the second optical signal transmitted in the higher-order mode $LP_{11}$ from the common portion to said second semiconductor photodiode.

11. A system as claimed in claim 10, wherein said modal filter is an uncladded section of optical waveguide whose diameter is sufficiently small that propagation therethrough in said higher-order mode $LP_{11}$ is essentially blocked and that essentially all the said second optical signal being propagated through said common portion in said higher-order mode is radiated into the exterior environment of the optical-waveguide section where it may be received by said second semiconductor photodiode, whereas the first optical signal transmitted in the fundamental mode $LP_{01}$ is transmitted through the optical-waveguide section to said first semiconductor receiver.

* * * * *